United States Patent
Bahadur

(10) Patent No.: US 6,639,349 B1
(45) Date of Patent: Oct. 28, 2003

(54) DUAL-MODE LCD BACKLIGHT

(75) Inventor: Birendra Bahadur, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 187 days.

(21) Appl. No.: 09/595,197

(22) Filed: Jun. 16, 2000

(51) Int. Cl.$^7$ .............................. H01J 1/62; H01J 63/04
(52) U.S. Cl. ...................... 313/483; 313/489; 362/260; 349/68
(58) Field of Search ................... 313/483, 484, 313/485, 489; 362/260, 227, 228, 229; 349/68

(56) References Cited

U.S. PATENT DOCUMENTS

| | | | |
|---|---|---|---|
| 4,074,124 A | * | 2/1978 | Maute et al. .............. 362/217 |
| 4,573,766 A | * | 3/1986 | Bournay, Jr. et al. ......... 349/65 |
| 5,036,436 A | * | 7/1991 | Rattigan et al. .............. 362/33 |
| 5,050,946 A | * | 9/1991 | Hathaway et al. ............ 385/33 |
| 5,220,249 A | * | 6/1993 | Tsukada ..................... 315/246 |
| 5,262,880 A | * | 11/1993 | Abileah ....................... 349/64 |
| 5,467,208 A | * | 11/1995 | Kokawa et al. ............... 349/67 |
| 5,479,328 A | * | 12/1995 | Lee et al. ................... 362/216 |
| 5,673,128 A | * | 9/1997 | Ohta et al. .................... 349/62 |
| 6,111,622 A | * | 8/2000 | Abileah ....................... 349/61 |
| 6,186,649 B1 | * | 2/2001 | Zou et al. .................... 362/347 |
| 6,357,893 B1 | * | 3/2002 | Belliveau .................... 362/285 |

* cited by examiner

Primary Examiner—Vip Patel
Assistant Examiner—Kevin Quarterman
(74) Attorney, Agent, or Firm—Nathan O. Jensen; Kyle Eppele

(57) ABSTRACT

A light system is disclosed that may be used as a dual-mode LCD backlight. The light system includes a fluorescent lamp and a secondary light source that is attached to or formed upon an outer surface of the fluorescent lamp. The fluorescent lamp diffuses the light of the secondary light source.

16 Claims, 3 Drawing Sheets

DUAL-MODE LCD BACKLIGHT

FIELD OF THE INVENTION

The present invention relates to display technology, and more particularly, to backlighting for liquid crystal displays (LCDs).

BACKGROUND OF THE INVENTION

Fluorescent lamps or tubes have been widely used for backlighting in liquid-crystal displays (LCDs). Fluorescent lamps are so used because they produce a high amount of luminance per watt of input power. Fluorescent lamps are also reliable and may be constructed in a variety of shapes.

One problem with fluorescent lamps is that it is difficult to adjust the brightness over a wide range. This drawback is especially apparent when it is desired to have an LCD backlight that may be used in both daytime and nighttime conditions in demanding applications such as avionics. During daytime conditions an LCD may be required to produce as much as 100–300 fL of luminance, while during nighttime conditions the required luminance may be as low as 0.02 to 0.1 fL. Color LCDs transmit about 5% of the light produced by its backlight. Therefore, avionics and other demanding applications require a very bright backlight with a high dimming capability. A fluorescent LCD backlight becomes very non-uniform at low luminance with high dimming.

Attempts have been made to obviate this problem by using secondary lighting that provides a lower level of lighting sufficient for nighttime use. However, known secondary lighting requires extra space. Such extra space may be difficult to justify in applications such as avionics, or in ground vehicles such as tanks, where space is at a premium.

Another problem concerns the use of night-vision (NVIS) filters that are required to be used with some avionics displays. Such NVIS filters remove red and infrared light from a light source. If the NVIS filter is situated such that it filters light during the daytime. mode, the colors of the LCD will be distorted during the daytime. Most importantly, red display output will appear orange. This NVIS filtering limits the colors that may be correctly displayed in a color LCD It is therefore ah object of the invention to provide a lighting system, suitable for use as an LCD backlight, that provides daytime and nighttime modes of operation.

It is another object of the invention to provide a lighting system that has a dual mode of operation and that uses a minimum of space.

It is another object of the invention to provide an LCD backlight that provides uniform lighting at low luminance levels.

It is still another object to provide an LCD backlight that does not distort the color output of a color LCD during daylight viewing conditions.

A feature of the invention is a dual-mode lighting system in which a fluorescent lamp provides a daytime lighting level and a secondary lighting system is disposed upon the fluorescent lamp.

An advantage of the invention is a dual lighting system that takes up no more space than a conventional fluorescent lamp.

SUMMARY OF THE INVENTION

The invention is a light system that includes a fluorescent lamp. A secondary light source is disposed upon an outer surface of the fluorescent lamp. The fluorescent lamp diffuses the light of the secondary light source.

In another aspect of the invention, a dual-mode LCD backlight is provided. The backlight includes a fluorescent lamp that provides a first luminance level when activated. A secondary light source, disposed upon the fluorescent lamp, provides a second luminance level when activated. The second luminance level is smaller than the first luminance level.

The invention further provides a method of backlighting a liquid crystal display for daytime and nighttime viewing. A fluorescent lamp having an inner surface is provided. The inner surface has a portion that is substantially free of a phosphor coating. A secondary light source is disposed upon an outer surface of the fluorescent lamp proximal the portion of the inner surface that is substantially free of the phosphor coating. The fluorescent lamp diffuses light emitted on the secondary light source.

DETAILED DESCRIPTION OF THE DRAWINGS

Figure 1:
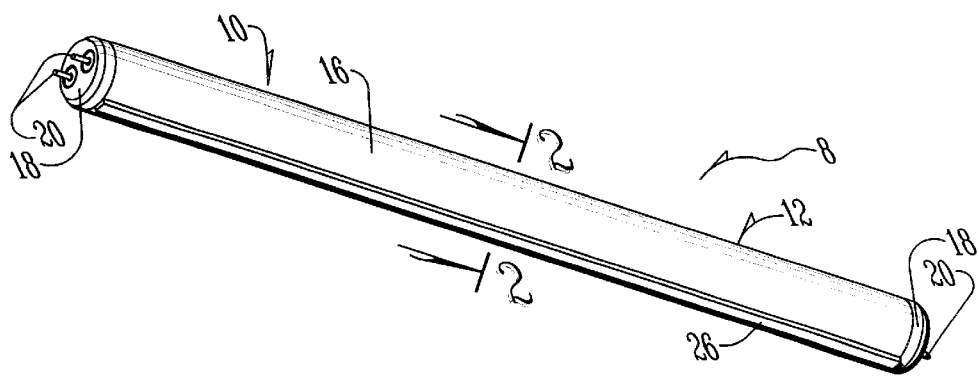
FIG. 1 is a perspective view of a light system according to the invention.
Figure 2:
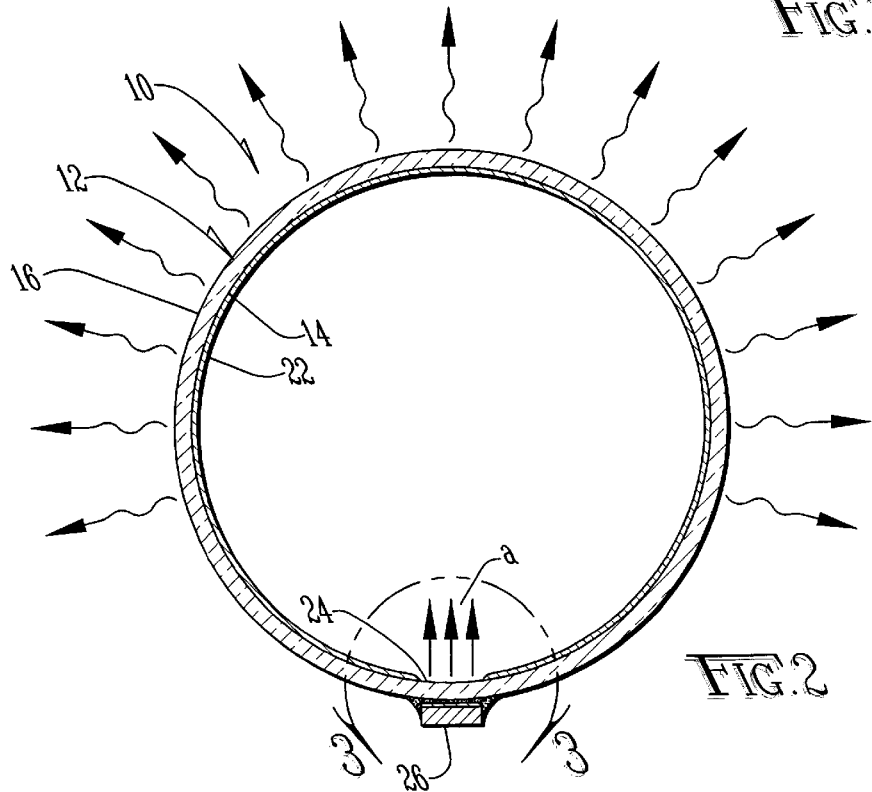
FIG. 2 is a cross section view of the light system taken along line 2—2 in FIG. 1.

FIGS. 1 and 2 show a light system 8 according to an embodiment of the invention. A primary light source is depicted as a fluorescent lamp 10. The fluorescent lamp includes a glass tube 12 with an inner surface 14 and an outer surface 16. The fluorescent lamp is sealed at its ends by metal end caps 18. Electrodes 20 on end caps 18 permit electrical current to be applied to the fluorescent lamp. A phosphor coating 22, such as a fluorescent coating, substantially covers inner surface 14. Phosphor coating 22 produces light when struck by ultraviolet radiation produced when electrical current passes through low-pressure mercury vapor (not shown) contained within the fluorescent lamp. Fluorescent lamp 10 is designed to provide sufficient luminosity to serve as an LCD backlight during daytime viewing conditions.

Figure 3:
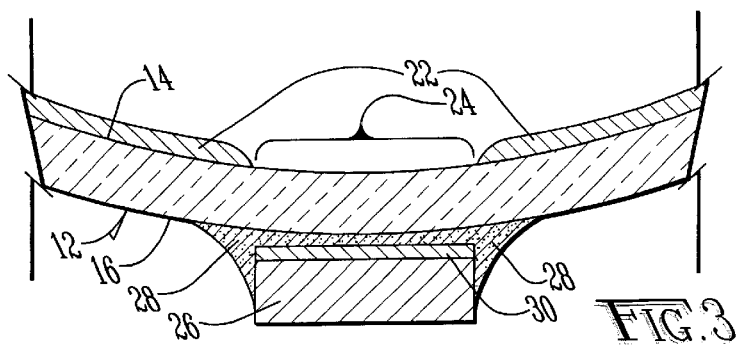
FIG. 3 is a detailed view taken along line 3—3 in FIG. 2.

A portion 24 of inner surface 14 does not have phosphor coating 22 placed thereon. In FIG. 1, this coating free portion 24 is depicted as a strip running along the length of glass tube 12. The coating free portion is small enough so that it does not substantially affect the luminosity of fluorescent lamp 10. Known methods of providing a coating-free portion to a fluorescent lamp may be used. A secondary light source, such as an array of light-emitting diodes (LED's) 26, is bonded by an adhesive 28 to outer surface 16 of glass tube 12 opposite coating-free portion 24 on inner surface 14, as shown in FIGS. 2 and 3. LED array 26 is used as the secondary light source because their small size enables them to be easily attached to glass tube 12. LED array 26 is designed to provide sufficient luminosity to serve as an LCD backlight during nighttime viewing conditions.

When used in an application such as an LCD backlight, light system 8 may be operated in a daytime viewing mode, which is intended to be used during normal daylight conditions. In the daytime viewing mode, fluorescent lamp 10 is on. Because the LED array is designed to have less than 1–5% of the luminance of fluorescent lamp 10, the LED array does not contribute appreciably to the brightness of an LCD backlight during the day mode. Therefore, LED array 26 may be on or off in the daytime viewing mode. In a nighttime viewing mode, which is intended to be used at night or during other times of low visibility, fluorescent lamp 10 is turned off and LED array 26 is used. Light from LED array 26 passes through coating free portion 24 of glass tube 12, as indicated by arrows a, and into fluorescent lamp 10. The fluorescent lamp diffuses the light from LED array 26, thereby evenly spreading the light such that the fluorescent lamp appears to faintly glow when LED array 26 is turned on and the fluorescent lamp is turned off. Light produced by LED array 26 and emitted from the fluorescent lamp may then be used as an LCD backlight in the nighttime viewing mode.

It may also be desirable to include an optical filter with the secondary light source. For example, a known night vision (NVIS) filter 30 may be placed between glass tube 12 and LED array 26 if light system 8 is to be used with NVIS compatible goggles. Other types of optical filters may be used as desired.

Adhesive 28 must maintain the bond between glass tube 12 and LED array 26 across a wide range of temperatures because the temperature of the glass tube may vary with the time the fluorescent lamp has been in use. Additionally, adhesive 28 should be transparent and must not be adversely affected by ultraviolet radiation resulting from the excited mercury vapor inside glass tube 12. As shown in FIG. 3, a layer of adhesive 28 is applied between LED array 26 and NVIS filter 30, which is placed directly upon outer surface 16. More adhesive 28 is applied on both sides of LED array 26 and NVIS filter 30 to maintain them in place upon outer surface 16. If desired, an additional layer of adhesive may be applied between outer surface 16 and NVIS filter 30. If an optical filter is not included with the secondary light source, the adhesive may be applied between outer surface 16 and LED array 26.

The secondary light source may alternatively include an electro luminescent (EL) element such as an organic light emitting diode (OLED) array. EL elements are especially advantageous because of their extremely thin and flexible nature. For example, OLED arrays have been constructed that are less than 0.01 inches thick. Other types of EL elements, such as those having a layer of phosphor material sandwiched between two electrically conductive layers, provide similar advantages. The secondary light source may also use other types of light-producing devices.

Figure 4:
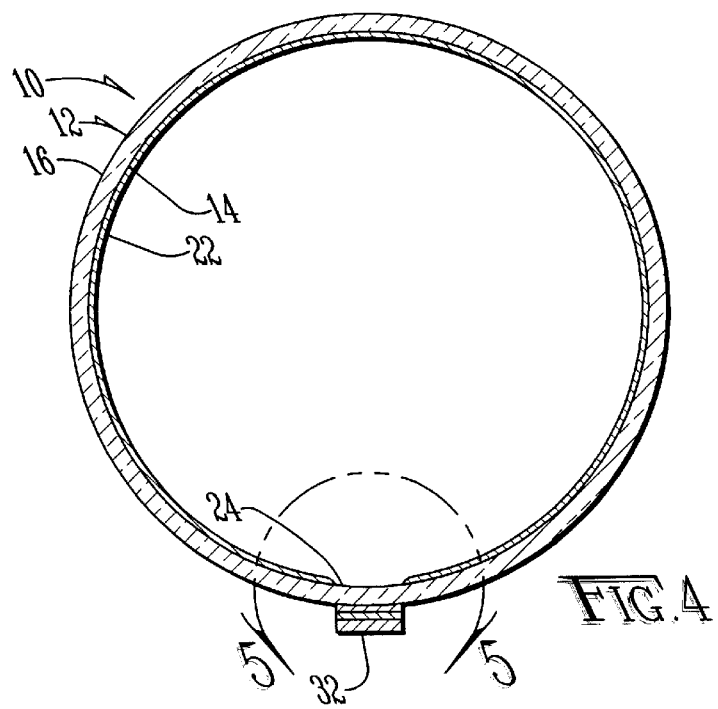
FIG. 4 is a cross section view, taken along line 2—2 in FIG. 1, showing another embodiment of the invention.
Figure 5:
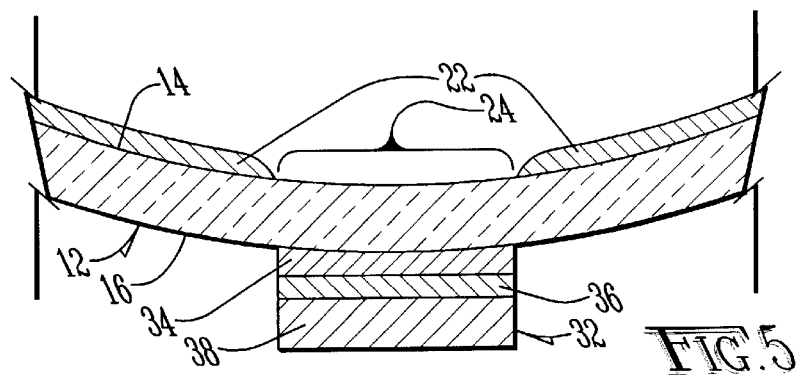
FIG. 5 is a detailed view taken along line 5—5 in FIG. 4.

FIGS. 4 and 5 show another embodiment of the invention in which the secondary light source is an EL element, such as an OLED 32, which is formed directly upon outer surface 16 of glass tube 12. Since this embodiment is similar to the previously described embodiment, components that are similar in both embodiments will be identified by similar reference numbers. As shown in detail in FIG. 5, OLED 32 has a first conductive layer 34 that is substantially transparent and preferably made of Indium-Tin Oxide (ITO). First conductive layer 34 is sprayed, painted, or otherwise applied to outer surface 16 opposite coating-free portion of inner surface 14. At least one layer of electroluminescent material 36 is next applied to first conductive layer 34, and a second conductive layer 38 is applied to electro luminescent material 36. Second conductive layer 38 may also be made of ITO, or may alternately have a metallic composition. Known vacuum deposition methods such as sputtering or chemical vapor deposition (CVD) may be used to apply layers 34, 36, and 38. First and second conductive layers 34, 38 act as capacitors when an electric current passes therebetween, and thereby cause electro luminescent material 36 to emit light. The light passes through first conductive layer 34, which is substantially transparent, and into glass tube 12 of the fluorescent lamp. Light from OLED 32 is diffused by fluorescent lamp 10 as previously described.

Figure 6:
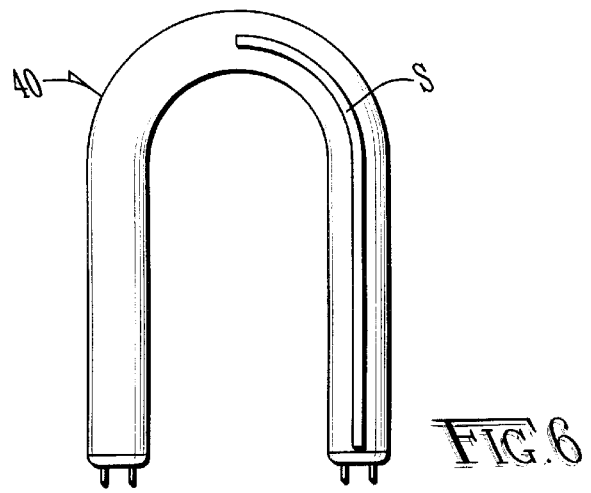
FIG. 6 is a bottom plan view of a U-shaped light system according to the invention.
Figure 7:
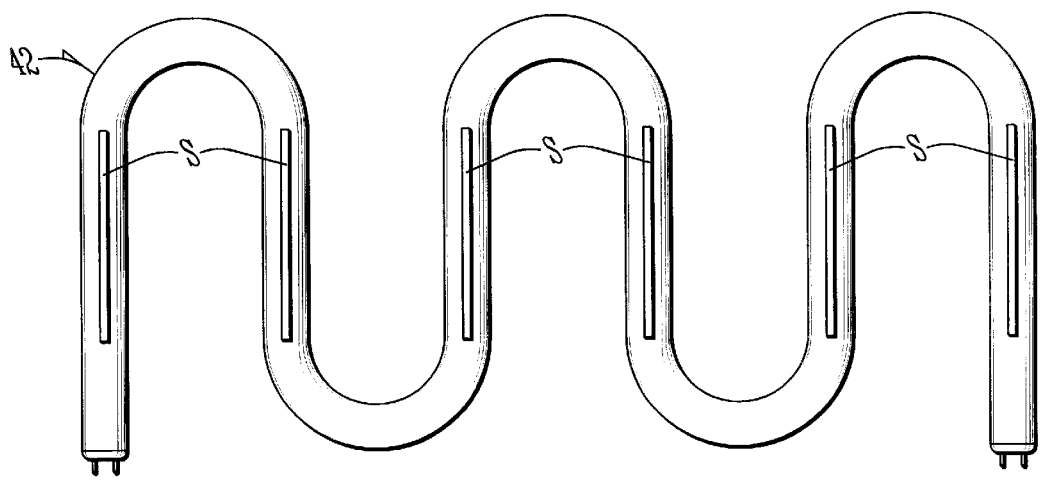
FIG. 7 is a bottom plan view of a serpentine light system according to the invention.
Figure 8:
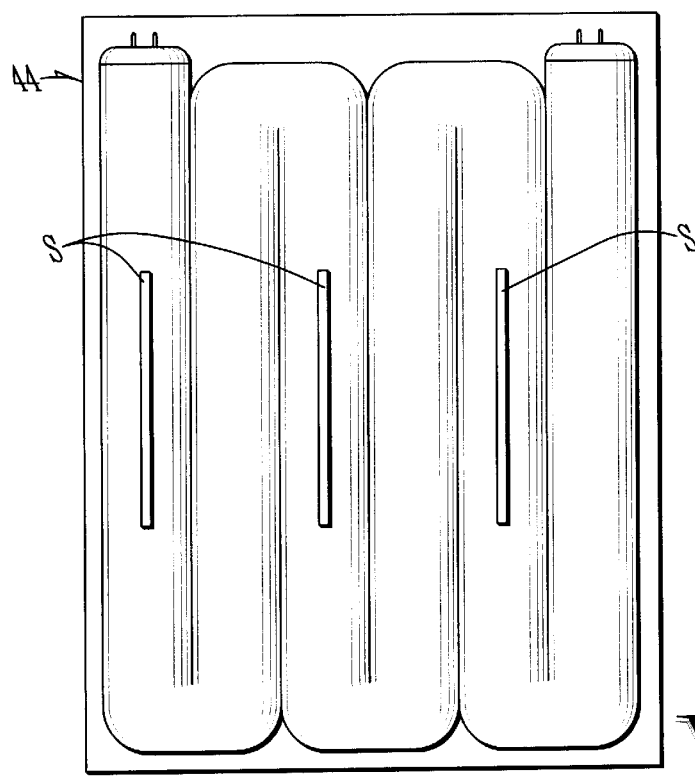
FIG. 8 is a bottom plan view of a flat lamp according to the invention.

As shown in FIG. 1, the secondary light source has the shape of a thin strip that is applied between end caps 18 along one side of a straight fluorescent lamp. However, the secondary light source may have other geometries, such as a plurality of linear or nonlinear segments, or circular or polygonal "spots" that are applied as desired to outer surface 16 of the fluorescent lamp. Furthermore, the invention may also be used with other shapes of fluorescent lamps. FIG. 6 shows a secondary light source S that is applied along the full or partial length of a U-shaped fluorescent lamp 40. FIG. 7 shows a plurality of secondary light sources S that are selectively applied along the length of a serpentine-shaped fluorescent lamp 42. Furthermore, the fluorescent lamp may have a cross-sectional shape that is different from the circular shape that is shown in FIGS. 1–7. For example, FIG. 8 shows a flat lamp 44 that is built according to known methods. A plurality of secondary light sources S is provided on a surface of flat lamp 44. It is considered to be within the ordinary skill of the art to determine how and where to attach secondary light sources S on flat lamp 44. It is possible to generate other combinations and types of lamp shapes, secondary light sources, and the shape and position of the secondary light sources in keeping with the spirit of the invention.

Figure 9:
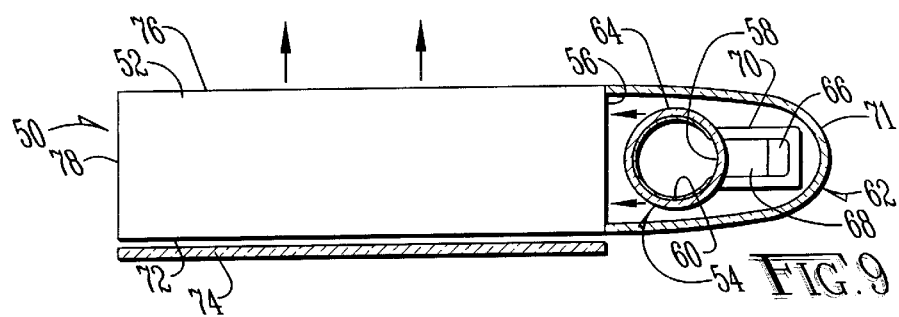
FIG. 9 is a front elevational view of an edge-lit waveguide according to the invention.

FIG. 9 shows one way in which the invention may be used in a backlight assembly 50. The backlight assembly includes a substantially transparent waveguide 52. Fluorescent lamp 54 is provided along an edge 56 of waveguide 52. Fluorescent lamp 54 includes a coating-free portion 58 on an inner surface 60 of the lamp. A secondary light source assembly 62 is attached to an outer surface 64 of fluorescent lamp 54. Secondary light source assembly 62 includes an OLED array 66, an NVIS filter 68 disposed between the OLED array and the fluorescent lamp, and a first reflector 70 surrounding the OLED array and the NVIS filter. First reflector 70 is arranged to direct the light produced by OLED array 66 toward fluorescent lamp 54. A second reflector 71 surrounds fluorescent lamp and secondary light source assembly 62 to direct all light produced therefrom toward edge 56 of waveguide 52.

Backlight assembly 50 works similarly to the embodiments previously described. Light from fluorescent lamp 54 and OLED array 66 enters edge 56 of waveguide 52 and, according to known principles, exits a first planar surface 72 of the waveguide. A diffuse reflector 74 is provided adjacent a second planar surface 76 of the waveguide to aid in the proper directing of light within the waveguide. Backlight assembly 50 is often referred to as an edge-lit backlight assembly because light from fluorescent lamp 54 and OLED array 66 enters edge 56 of waveguide. Additional fluorescent lamps similar in construction to fluorescent lamp 54 may be placed along edge 56 or along another edge 78 of waveguide 52. Furthermore, the fluorescent lamp in this or previously described embodiments may be placed adjacent other surfaces of waveguide 52, or may be used without a waveguide if desired or required by a particular application.

Another variation is to select the secondary light source such that the light emitted therefrom includes ultraviolet light. When emitted into the fluorescent lamp, the ultraviolet light causes the phosphor coating in the lamp to glow. Yet another variation is to dispose the secondary light source in direct contact with the fluorescent bulb without using adhesives. This would aid in the repair and interchangeability of the secondary light source.

An advantage of the invention is that the lighting system may be used as an LCD backlight during daytime and nighttime conditions.

Another advantage of the invention is that required space for a backlight is minimized. Since the secondary light source is thin and attached directly to the fluorescent lamp, very little extra space is required for the secondary light source.

Still another advantage is that the secondary light source uses the fluorescent lamp as a diffuser to evenly spread the light from the secondary light source. This eliminates a separate diffuser that would otherwise need to be included in the design.

Yet another advantage is that the secondary light source produces little heat. This eliminates the need to include cooling components solely for the secondary light source.

Yet another advantage is that the invention places an NVIS filter so that it does not filter light during daytime viewing conditions. This enables a color LCD to accurately display all colors, especially those colors that include red wavelengths.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A light system comprising:
   a fluorescent lamp having an outer surface; and
   a secondary light source disposed upon the outer surface of the fluorescent lamp, the fluorescent lamp diffusing the light of the secondary light source.

2. The light system of claim 1, wherein the fluorescent lamp has an inner surface that is partially coated with a phosphor substance such that a portion of the inner surface is free of the phosphor substance.

3. The light system of claim 2, wherein the secondary light source is attached to the outer surface of the fluorescent lamp proximal the portion of the inner surface that is free of the phosphor substance.

4. The light system of claim 1, wherein the secondary light source includes an electro luminescent element.

5. The light system of claim 4, wherein the electroluminescent element includes a layer of electroluminescent material disposed between first and second conductive layers, and wherein the first conductive layer is formed upon the outer surface of the fluorescent lamp.

6. The light system of claim 5, wherein the first conductive layer is substantially transparent.

7. The light system of claim 4, wherein the secondary light source is an organic light-emitting diode.

8. The light system of claim 1, wherein the secondary light source is a light-emitting diode.

9. The light system of claim 1, wherein the secondary light source includes an optical filter that is positioned to selectively filter light produced by the secondary light source.

10. A dual-mode LCD backlight, comprising:
    a fluorescent lamp that provides a first luminance level when activated;
    a secondary light source, disposed upon the fluorescent lamp, that provides a second luminance level when activated;
    wherein the second luminance level is smaller than the first luminance level.

11. The LCD backlight of claim 10, wherein the secondary light source is attached to the fluorescent lamp.

12. The LCD backlight of claim 10, wherein the secondary light source includes an electro luminescent element.

13. The LCD backlight of claim 12, wherein the electro luminescent element includes a layer of electro luminescent material disposed between first and second conductive layers, and wherein the first conductive layer is substantially transparent and is formed upon an outer surface of the fluorescent lamp.

14. The LCD backlight of claim 10, wherein the secondary light source includes an optical filter that is positioned to selectively filter light produced by the secondary light source.

15. The LCD backlight of claim 10, wherein the light emitted by the secondary light source includes ultraviolet light.

16. The LCD backlight of claim 10, further including a substantially planar waveguide having a planar surface and an edge surface disposed at an angle with respect to the planar surface, wherein the fluorescent lamp is situated adjacent the edge surface, and further wherein light exits the waveguide through the planar surface.

\* \* \* \* \*